3,039,604
Patented June 19, 1962

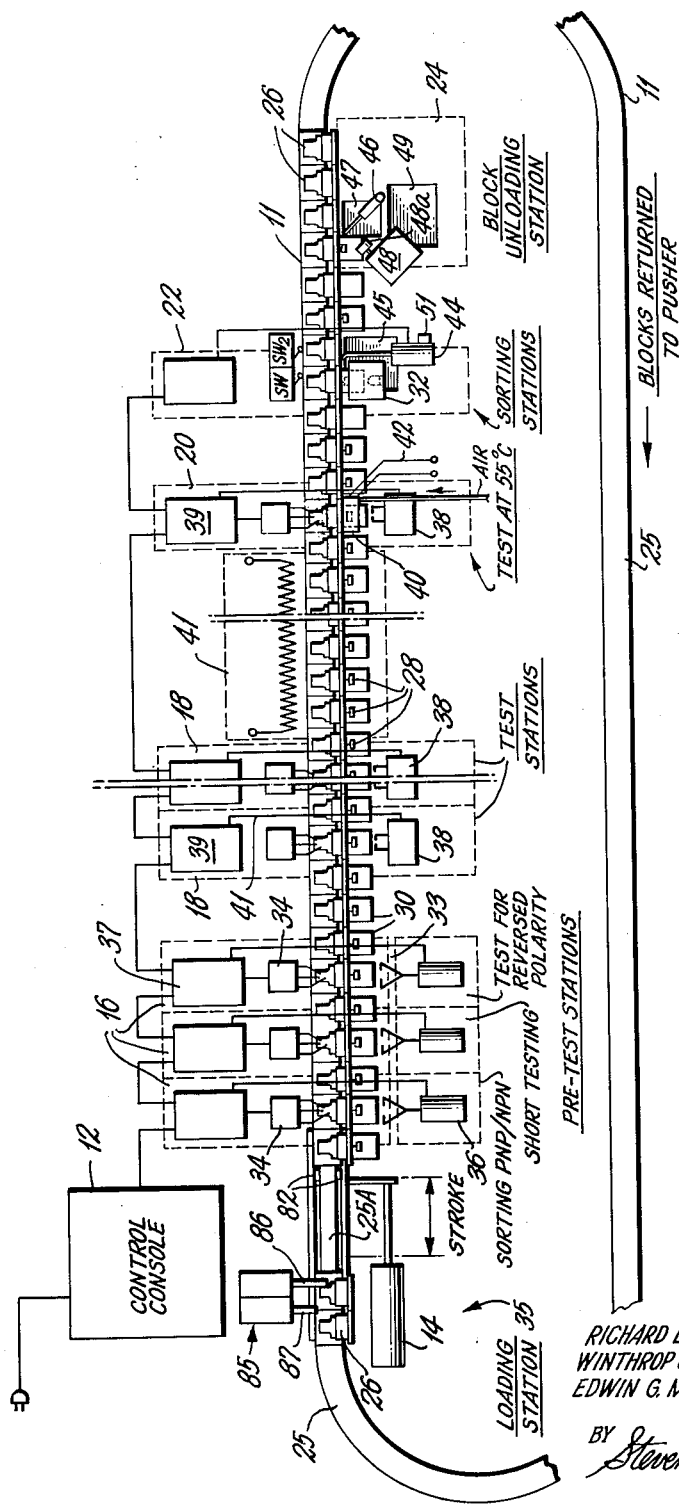

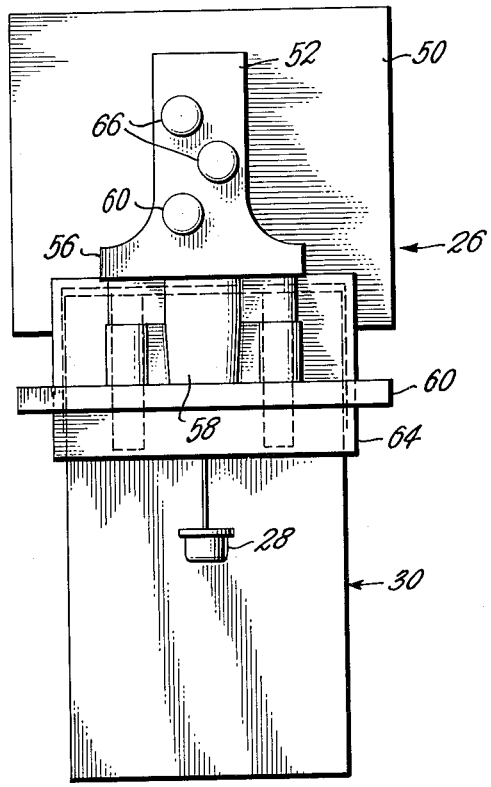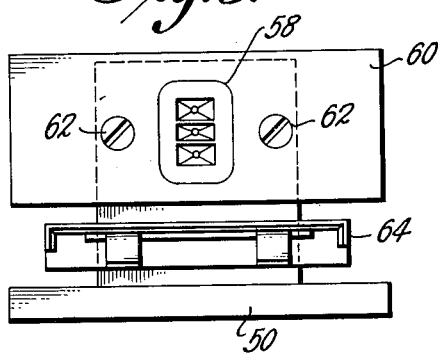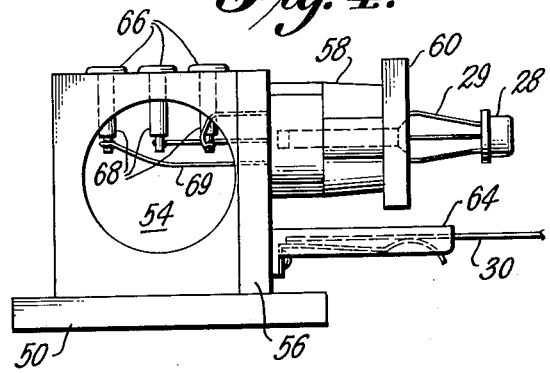

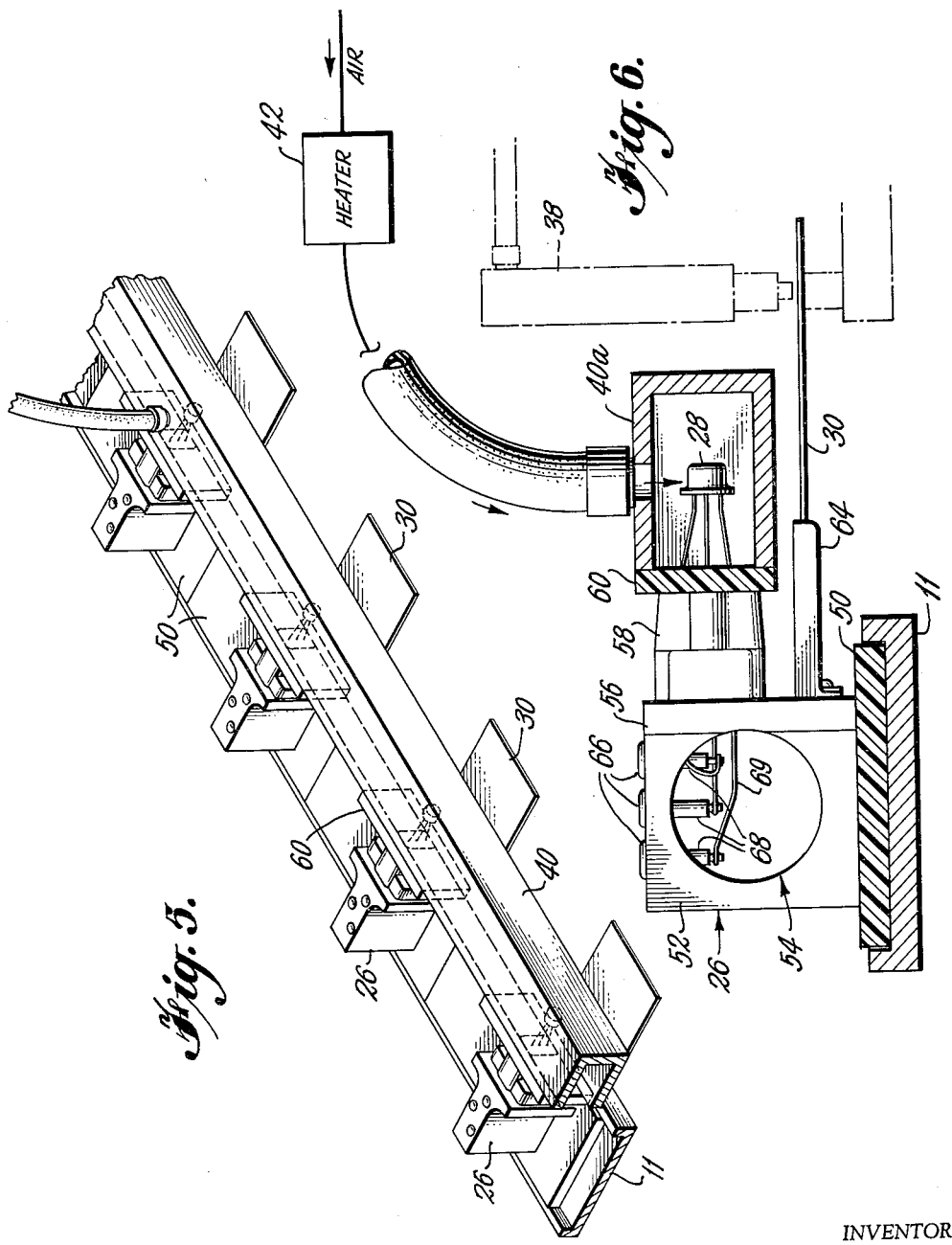

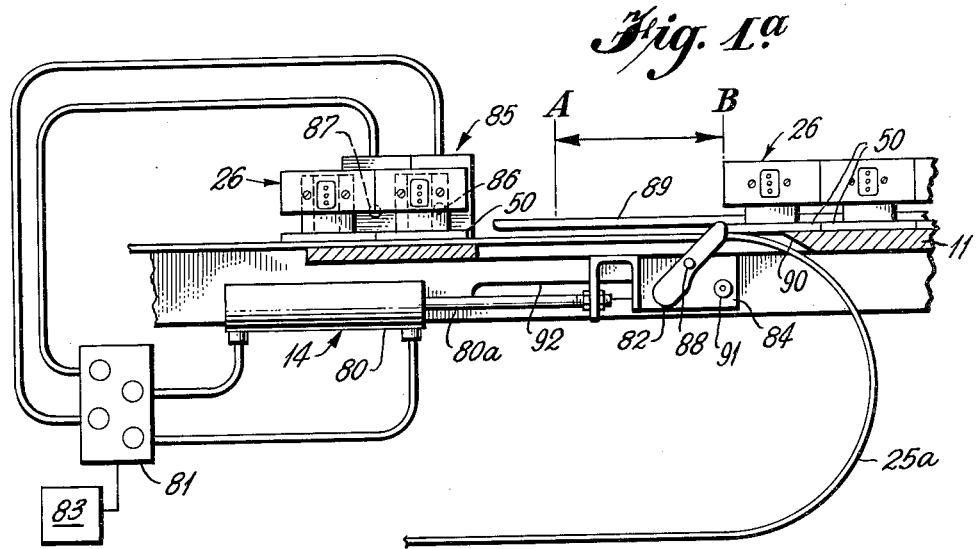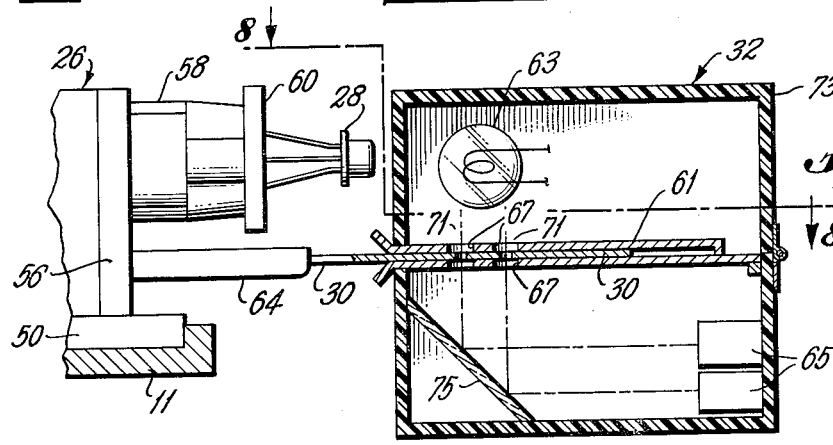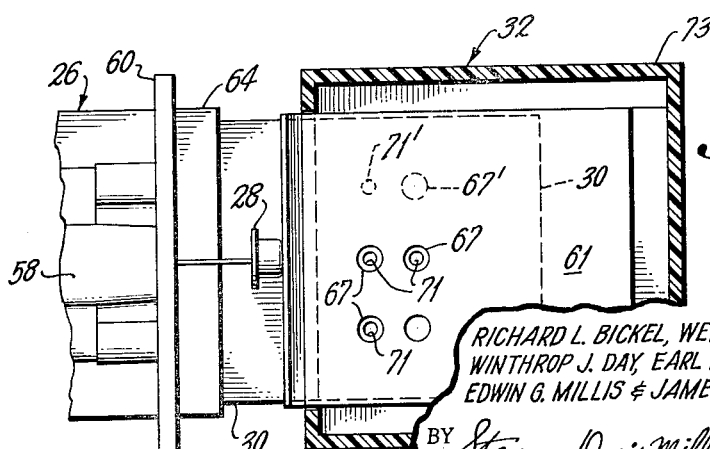

3,039,604
CENTRALIZED AUTOMATIC TESTER FOR SEMICONDUCTOR UNITS
Richard L. Bickel and Wendell C. Brooke, Dallas, Winthrop J. Day, Richardson, Earl D. McDonald, Jr., Dallas, Edwin G. Millis, Houston, and James L. Nygaard, Dallas, Tex., assignors to Texas Instruments Incorporated, Dallas, Tex., a corporation of Delaware
Filed Sept. 10, 1959, Ser. No. 839,106
11 Claims. (Cl. 209—75)

The present invention relates to a testing apparatus and more particularly to a testing apparatus suitable for quantity production testing of circuit components such as transistors and other semiconductor devices whereby the devices are automatically conveyed through a series of consecutive test stations, with each station checking predetermined device parameters according to preset standards.

In general, testing and sorting of semiconductor units, such as transistors, are performed by techniques involving a large variety of apparatus requiring numerous and distinct test set-ups taking up a great deal of time and labor. Quantity production testing of transistors is a rather slow and tedious process wherein a different piece of apparatus is utilized for each specific test so that a continuous testing cycle cannot be satisfactorily maintained. In addition, present methods of transistor testing require constant supervision of the various testing steps to complete the battery of tests necessary to quality prove semiconductor units.

It will be obvious that the number and complexity of the problems involved in the presently used methods of testing and sorting semiconductor units makes simplicity of apparatus almost impossible but very desirable and essential if quantity production is to be readily achieved. Therefore, it would appear that there is a need for a simple and continuous method of production testing semiconductor units under various predetermined conditions to obtain reliable results for all of the significant parameter values.

The present invention in its preferred form comprises a semiautomatic transistor testing machine suitable for quantity production testing of transistors wherein the various tests are automatically integrated into one continuous process that extremely simplifies quality testing procedure. Specifically, the invention comprises a simplified method of testing and sorting transistors or other devices for quantity production wherein apparatus is used which automatically performs the various tests for predetermined device parameters. A testing block is provided to receive a device to be tested and servve as a test platform adapted to be automactically actuated through a preset testing cycle. Each device tested, regardless of kind or size, is automatically brought into contact with a variety of test equipment so that the device can be classified in accordance with an approved quality standard or rating.

A plurality of testing blocks, each mounting a device to be tested, are suitably actuated by a conveyor, such as a pusher device, which moves each block in an unbroken cycle between the various test stations wherein predetermined device parameters are automatically checked and results recorded. In addition to the device to be tested, each block contains a unit memory device for recording thereon the results of the tests which, in turn, initiate suitable sorting of the tested devices. Accordingly, at each testing station the results of the tests are read, transmitted to and simultaneously compiled on each unit memory device, such as a punch card or the like, until the unit under test has completed its testing cycle and arrives at a series of sorting stations where each memory device is decoded to permit proper sorting and classification, and ultimate rejection of unusable units.

Briefly, integrated functions of testing and sorting are automatically performed by the present apparatus to save time and to obtain uniformity of test results in quantity production of devices. In addition, a self-testing or calibrating cycle is provided in the apparatus and is operative when the blocks are in the process of advancing from one test station to another. During this period the calibration of each test station is checked by providing a calibrate resistor in the test circuit predeterminedly calculated to any standard, for example, to a borderline reject. If the calibration of a particular test station does not check properly, the main controls of the apparatus are stopped automatically and the indicated defective test station may be promptly serviced.

An object of the present invention is the provision of a simplified method and device for the quantity testing and sorting of devices such as semiconductor units.

Another object is to provide a testing apparatus and method which automatically integrates the various production tests into a continuous process that extremely simplifies the testing and sorting of devices such as transistors in quantity production.

A further object of the invention is the provision of a centralized testing apparatus with means for testing and simultaneously calibrating the results thereof on a single supporting and movable structure to test and sort production devices automatically in an integrated mass production system.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a block diagram of a preferred embodiment of the invention illustrating a complete test system for semiautomatically testing transistors;

FIGURE 1A is a fragmentary detail view partly in schematic, illustrating the pusher operation which imparts movement to the transistors under test;

FIGURE 2 is a plan view of a test block provided for transporting the transistor through the test cycle;

FIGURE 3 is a front view of the test block of FIGURE 2 showing a preferred socket structure;

FIGURE 4 is a side view of the test block showing the electrical connections;

FIGURE 5 is a perspective view of a heating device for testing transistors at an elevated temperature;

FIGURE 6 is a side view, partly in section, of the heating device of FIGURE 5;

FIGURE 7 is a side view, partly in schematic, showing the decoding device utilized in the method of this invention; and FIGURE 8 is a cross-sectional view taken along the lines 8—8 of FIGURE 7.

The present invention will now be described in connection with its use in testing transistor devices, although it should be kept in mind that the device and method described may be easily adapted to the production testing of many other and varied types of devices without departing from the teachings herein.

Referring now to the drawing, there is illustrated a preferred embodiment comprising a test cycle, with a test track 11, controlled by a master console 12 operatively coupled to a pusher 14 cooperating with a plurality of pretest stations 16 for preliminary sorting of the transistors to be tested. Next, a number of test stations 18 with testing facilities for checking predetermined electrical transistor parameters are provided in the test cycle along with a number of environmental test stations 20, for testing the same or similar transistor parameters at an elevated temperature. Adjacent to stations 20, sorting stations 22 are provided, for classifying the transistors in accordance with the test results from the preceding test stations. Finally, a block unloading station 24 is provided in the test cycle to remove any transistors remaining in the test blocks and all of the test data recording means. The empty test blocks are then pushed onto a conveyor means 25 which returns them to the loading position to permit the insertion of untested transistors and new recording means into the cycle to provide a continuous transistor testing system.

The disclosed embodiment is a semiautomatic transistor testing machine suitable for production use, wherein a plurality of tests may be performed on a transistor for sorting into any predetermined categories. A transistor supporting and transporting means, such as a test block 26, is provided to support a transistor 28 in a desired test attitude and to carry temporary memory means such as a punch card 30, or the like, along with each transistor as it moves down the test track 11. Information for sorting the transistors is obtained from test results, suitably punched on the punch card, with the assistance of suitable card masking means and coacting photocell means 32 (FIGURE 1). As the test block 26 with its respectively mounted transistor moves through the test cycle, acceptable units or selected rejects are automatically removed from their respective blocks and dropped through slots 33 at stations 16 or into suitable containers or stock bins 45 provided at each of the stations 22.

As seen in FIGURES 2 through 4, in one embodiment the test block 26 comprises a base platform 50, adapted to travel on the test track 11 from test station to test station, and a terminal block 52 centrally fixed on the platform perpendicular to the plane thereof. The terminal block is provided with a center aperture 54 and with a flange portion 56 having a conventional three prong socket 58 secured thereon. An end wall-plate 60 is mounted on the socket and jointly mounting in parallel relationship to the flange portion 56 of the terminal block by suitable securing means, such as screw means 62, and the like. It will be obvious that the transistor leads 29 can be easily inserted in the socket 58 and the transistor 28 supported therein in the manner shown in FIGURE 4.

In addition, a card clamp 64 is perpendicularly secured to the flange 56 to support the punch card so as to substantially extend out from the test block beneath the wall plate 60. Accordingly, as the test block progresses through the test track 11, the card will protrude sufficiently from the block to operatively coact with the various punches 38 at each of the stations 18 and 20 to record test results. Further, the cards will also operatively coact with the sorting station decoding device 32 to be analyzed as to the intelligence recorded thereon to determine which transistors conform to the standard of the particular station 22 and should be pulled out by the movable puller 44 of that station.

Each test block 26 is provided with a plurality of electrical contacts 66 having terminal ends 68 protruding into the center aperture 54. The terminal ends 68 are electrically coupled to the leads 29 of the three-prong socket 58 by suitable wiring means 69 as shown in FIGURE 4. The contact points 66 operatively engage the contact points 34 provided at stations 16, 18 and 20 for performing the transistor test and for information readout to the punches. As seen in FIGURE 6, the wall plate 60, integral with the test block 26, serves as a closing wall for the section of the oven 40, to be described subsequently, in which the heat environment test of the transistor 28 is performed.

A master console 12 provides power supply means to the various test stations and serves as the junction and correlation point for the stations control system. The power supply and the junction units incorporated in the master console will vary with the number of test stations used in the test cycle which, of course, is a function of the number of transistor parameters to be tested. Therefore, it will be obvious that the specific construction of the master console may vary with various applications and does not form a part of the present invention.

In starting the testing operation of the present invention, individual transistors to be tested are loaded by hand into sockets 58 of test blocks 26 and "memory" cards 30 are inserted in the clamps 64 of each block. The loaded test blocks are then placed on conveyor belt 25a to be carried to a pusher mechanism 14.

The pusher means 14 is then utilized to move the manually loaded test blocks intermittently along the test track 11. In the preferred embodiment, the pusher device is placed at the beginning of the test track 11 to linearly force the plurality of adjacent test blocks through the various test and sorting stations. The pusher device may be powered by suitable electrical, pneumatic or hydraulic means, or the combination thereof, to move the test blocks approximately three inches at each forward stroke during an approximately three second testing cycle. In this manner, the pusher device 14 controlled by the master console 12, moves each test block 26, with its transistor 28 and memory device 30, in a continuous test cycle through the various test stations where contact is made with the test apparatus and the desired test automatically performed on each transistor. After the desired test has been performed at a particular test station, test transfer means, including punch 38 and memory card 30, transfers the test results to each block 26.

One embodiment of a pusher mechanism is illustrated in FIGURES 1 and 1A. In this embodiment the pusher 14 includes a double acting piston 80 with its arm 80a whose forward stroke is activated by an electrically controlled pneumatic valve 81 in such a manner that the attached carriage 84 with pivoted members 82 are moved from position A to position B in one and one-half seconds. The members 84 carry test block 26 forward the length of stroke A—B and in so doing advance the entire line of test blocks 26 in track 11. The electrically controlled pneumatic valve 81 then receives another electrical signal from the timer unit 83 and in response thereto sends air to pusher 14 to retract the arm 80a and its attached carriage 84 from position B back to position A. Valve 81 is also connected to a pneumatic gate unit 85 having plungers 86 and 87 which operate alternately and cooperate with the movement of piston arm 80a in such a manner that the test block 26 on conveyor 25a approaching position A is retained by plunger 86 until the block 26 just past position A has been advanced forward exactly one block width to advance the entire line of blocks one station. FIGURE 1A shows the plunger approaching this last described position, and just after this point the plunger 86 will retract so that the conveyor belt 25A will carry the block 26 thus released on down to position B. At the same time plunger 87 is operated to prevent other blocks from advancing until plunger 86 is again in position to restrain the advancement of other blocks 26. Thus, only one block at a time is released to the pusher. While the released block is traveling forward, the piston arm 80a, carriage 84 and members 82 will be traveling in the opposite direction and the top of members 82 will engage the bottom platform 50 of the advancing block 26. The members 82 will be caused to pivot downward about their axis pivot 88. A guide rail 89 on track 11 prevents the blocks 26 from being pushed up by pivot members 82 and overriding an adjacent block. Track 11 also includes a slot 90 to permit the continuous conveyor belt 25A to complete its circuit. Once they have passed slot 90, the movement of the blocks 26 is totally dependent upon the action of pusher 14. The carriage 84 is provided with a roller 91 which rides in a groove 92 in the side wall of track 11 to facilitate the movement of the piston arm 80a.

Thus, it will be observed that once the manual loading of the test blocks with both transistors and cards is accomplished and the blocks are placed on the conveyor 25A at the loading station, then the operation of the test system becomes totally automatic until all of the transistors are tested and sorted and the empty test blocks are returned to the loading station.

Pretest stations 16 provide the first step in the test cycle of the semiconductor units. Pretest stations are provided to sort and remove transistors which are of the wrong type or different than the selected type to be tested. For example, one pretest station may sort out all PNP types, to leave only NPN types, while another station may remove shorted or punched-through transistors and, further, another may remove transistors plugged into the test block backwards.

Each pretest station is provided with a number of contact points 34 which electrically contact coacting terminals 66 on the test block 26. This action completes an electrical circuit through a test set 37. In response to the electrically obtained test results, an automatic transistor puller 36 provided at each pretest station will either remove the transistor upon a signal from the test set 37 or remain inoperative during that particular portion of the cycle.

Test stations 18 are provided adjacent the pretest stations to test for predetermined transistor parameters at room temperature. During each testing cycle, after the test circuit stabilization period has expired, the test results are read in a test set 39 and a suitable signal transmitted to a card punch device 38 via lead 41 to record the test results on the punch card 30. As previously stated, the test stations 18 are used to test for any predetermined transistor electrical parameter measurement and, of course, any number of adjacent test stations may be used. Each test station 18 is provided with a test set 39 including test circuit and a built-in standard calibrate resistor, which is used to check the circuit at each station between each transistor testing. Thus, if the test shows the circuit to be off calibration, the console 12 automatically stops the test cycle.

The built-in testing cycle, which may be on the order of about three seconds, allows a period of about one and one-half seconds for the transistor testing and information readout to the punch 38, and a second period of about the same length for advancing the line of test blocks by the pusher 14. The second period is also utilized to check the calibration of the test stations, as indicated above, by the substitution of the calibrate resistor in the test circuit. The resistor is calculated to be a borderline reject, and if the circuit does not test out properly, the console 12 receives a signal and stops the entire apparatus. An indicator light (not shown) will then identify the defective test station. The same type of check cycle is used to test, for example, the lamp, photocell and photocell amplifier incorporated in the instrumentation of the sorting station 22, as hereafter disclosed.

Test stations 20 are provided adjacent to test stations 18 and spaced therefrom by a section of the test track 11 having an oven structure 40 fixed adjacent thereto wherein the temperature is elevated from room temperature to any desired test temperature. In the preferred embodiment, the transistor temperature is elevated in a warm-up oven section 41 to substantially 55° C. The warm-up track portion may be of any predetermined length, however, in the preferred embodiment it has been determined that approximately a six foot length is required. Both the warm-up oven section and the test oven section comprise a channel member 40a (FIGURE 6) having three sides. The fourth side of the oven is provided by the plates 60 of the test blocks 26.

Heating is provided for the ovens by blowing air over a heater 42 and then along the length of the oven. Auxiliary heating means, such as a resistance heater mounted in the walls of the channel 40a, may be provided to eliminate any undesired temperature gradient along the length of the oven. As shown in FIGURE 6, the test block 26 supports the transistor within the oven structure 40 extending into the test track portion associated with the test station 20 to expose the transistor to the hot air flow along the oven and thus heat it to the desired temperature. Oven test stations 20 perform the same testing operations as at test stations 18 but at an elevated temperature. The test station 20 is also provided with a punch 38, for recording on the punch card carried by the test block the test results obtained at that station.

Sorting stations 22 are provided adjacent test stations 20, having memory decoding devices 32 which determine whether or not tested transistors are to be pulled out of the test block by a particular sorting station puller 44. The puller 44 may be operated pneumatically, hydraulically or electrically, or by any other suitable means, to move in the way of the transistor's path and to pull transistors which meet the standard of the particular station. In a modified embodiment the transistors may be pulled if they do not meet a particular station's standard. A switch SW is provided as part of the instrumentation on station 22 to activate the decoding device 32 to permit a photocell contained therein to scan the punch card, in a well-known manner, and, in turn, to activate the puller 44 to remove transistor 28 when the block has moved past the decoder device 32 if the card so indicates. The transistors pulled at each station 22 drop into removable bins 45 at each sorting station 22 for subsequent transfer to packing, shipping or storing areas.

The block unloading station 24 is provided adjacent stations 22 and supports thereon a transistor puller 46 for removing from the test blocks any remaining transistors which do not fit into any of the classifications removed by any of the previous puller stations and dropped into a slot 47. In addition, a card puller 48 is provided on the station 24 to automatically remove and discard the punch cards mounted on each test block by permitting them to drop through slot 49. After each test block 26 goes past the unloading station 24, the now empty blocks are returned to the beginning of the test track 11 to be reloaded with transistors and punch cards for another test cycle, as hereinbefore described.

The puller 44, in this embodiment, is pneumatically advanced and spring returned, both operations being controlled from an electric signal. The signal to advance the arm of the puller 44 is determined by the results of the decoding device 32 and the signal to retract the arm 80a is sent when a second switch $SW_2$ is closed to signify the test block 26 has moved beyond the decoder device 32 and is in the proper position to permit its transistor 28 to be pulled. The puller 44 is actuated in a practical application by a conventional electric solenoid controlled pneumatic valve 51 which is connected to a compressed air supply line (not shown) and will rapidly open to direct pressurized air to the forward stroke port of the puller cylinder and move its arm forward. Upon receiving a second electrical signal, the valve 51 will rapidly exhaust the air from the puller cylinder and permit the return spring to return the puller arm and thus extract the transistor 28.

The test stations 18 and 20, as shown in FIGURE 1, are provided with punches 38 for recording test results on the punch cards carried by each test block. The results of the go-no-go test at each of these stations selectively actuates the respective punch to either punch or not punch the card 30. The location of the punches 38 are staggered on their respective test stations so that the hole punched on the cards by each punch will not coincide with the holes made by the other punches. In the preferred embodiment, a punched hole indicates that the transistor tested is not equal to the predetermined standard of a particular station and will be pulled at a particular sorting station.

In FIGURES 7 and 8 it will be seen how the results of the parameter tests are analyzed at sorting stations 22 by the decoding device 32 which incorporates an easily changeable mask 61, lamp 63 and photocells 65. The mask for each sorting station will have predetermined openings 67 thereon on its top and bottom guide plates so that each station 22 can sort out transistors of a particular range of parameter values. Hence, if a card 30 of one of the transistors has been punched at either one of the stations 18 and 20 to indicate a particular value parameter, the card will be lined up with the mask at each sorting station and if the holes 71 on the card 30 and the openings 67 of a particular mask match up, the puller 44 is activated to remove the transistor at that point. Other masks will have openings spaced at other locations as indicated at 67' in FIGURE 8.

By the construction of the housing 73 of the decoder device 32, the lamp 63 will be held in a horizontal position so that the strongest light rays will pass through the openings 67 of the mask 61 and through the particular card holes 71 and will strike an inclined mirror 75 and be reflected in a horizontal line onto a particular photocell 65 to complete an external test circuit.

In the operation of the apparatus, a transistor 28 is placed in the socket 58. The test block 26, by means of its platsform 50, is mounted on the test track 11 to intermittently travel there along from one test station to another, affixed to the track at six-inch intervals. The punch card 30 is mounted in the card clamp 64 to travel along with the transistor to each station to record the test results thereon by punch holes. Thus, while traveling the test system, the integrated functions of testing and sorting are automatically performed on the transistor to permit rapid quantity production testing of transistor parameters at different temperatures.

Specifically, the pusher 14 moves the test block 26 into the test position during the forward stroke, and during the rearward stroke of the pusher the results of the tests are read, and certain particular readings will activate the punch 38 to compile the test results on a corresponding transistor punch card. This operation continues until the transistor has completed its test cycle through the specified tests, and arrives at the sorting station 22. In the sorting station the transistor's corresponding memory or punch card is easily decoded to allow the transistor to be sorted and classified. In each forward stroke of the pusher, the test blocks and supported transistors are moved to the next station, located at six-inch intervals, where the test block contact points 66 engage the station contact points 34 and the electric testing is performed automatically. Finally, transistors which have not been sorted into predetermined categories are removed from the test blocks automatically at the end of the test cycle by the fixed transistor puller 46 and dropped into slot 47. The punch cards are also automatically removed from the test block and discarded by the card puller 48 which consists of engaging and counter rotating rolls 48a between which the cards 30 are guided. The test blocks are then automatically returned to the beginning of the test system for new transistors and cards by the conveyor 25 onto which the blocks 26 drop when they leave track 11. The preferred embodiment is capable of testing approximately 1200 transistors per hour.

Test circuits associated with the test set 37 or 39 of each test station and which determine the test conditions and desired reject limits are in the form of conventional plug-in cans. These plug-ins allow quick repair in case of failure and permit readily changeable test conditions for testing different transistor parameters. In the preferred embodiment all test conditions are set up from a common 250 volt D.C. power supply using passive components and located in the control console 12. Each test station is provided with a null-detector in either a current or a voltage bridge to determine the range limits for each test. Standard adjustable voltages or currents are supplied by a plug-in unit containing mercury cells.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A method of testing and sorting semiconductor units suitable for production use, wherein each of a plurality of transistors is manually loaded in a respective test block, supplying each test block with a punch card for indicating the results of each test thereon, predeterminedly and intermittently pushing said plurality of test blocks along a test track, passing each of said test blocks through one of a plurality of test stations affixed to the track at predetermined intervals and containing predetermined test circuitry, punching test information on certain of the punch cards at particular test stations in response to the test results, removing wrong type, and inoperative units at a pretest station, decoding the punch cards by passing each one through a mask and photocell, sorting and removing certain of the transistors in accordance to a predetermined standard of particular stations, removing all remaining transistors from the test block automatically at the end of the track, and returning the empty test blocks to the beginning of the test track for new transistors and cards.

2. A semiautomatic transistor testing machine suitable for quantity production testing of transistors comprising a power actuated pusher means having a forward and a rearward stroke, a test track operatively associated with said pusher means, a plurality of test blocks each having a transistor supported thereon, and slidably mounted in juxtaposed relationship on said track, said pusher means operatively associated with said juxtaposed test blocks on the forward stroke to move the test blocks along said test track, testing means affixed at predetermined intervals to said test track for testing each of the transistors for selective electrical parameters, memory means including a multi-bit memory device capable of receiving and storing additional information at each testing means, said memory device being physically coupled to each of said test blocks for recording the transistor test information thereon during the rearward stroke of said pusher means, transistor sorting means operatively coupled to said track and operatively associated with said testing means for removing transistors according to the test results.

3. A semiautomatic transistor testing machine for quantity production testing of transistors comprising a plurality of test blocks, each having a memory device supported thereon, a semiconductor unit mounted on each of said test blocks and electrically coupled thereto, test track means having a predetermined test cycle associated therewith and slidably supporting thereon said test blocks in a juxtaposed relationship with each other, a plurality of test stations coupled to said test track means, adapted to sequentially contact said test blocks to electrically test each transistor according to selected categories, test transfer means at each test station, and sorting means coupled to said test track means responsive to the output of said test transfer means to sort the transistors into the selected categories.

4. A method of testing and sorting semiconductor units for quantity production of transistors, wherein each of a plurality of transistors is manually loaded in their respective test block, inserting a punch card in each test block to serve as a temporary memory means, intermittently pushing said plurality of transistors in juxtaposed relationship along a testing track with test stations affixed there along at predetermined intervals, testing each transistor for predetermined electrical parameters, selectively punching test information at each test station on the test card carried with the transistor, decoding the information punched on the card carried by each transistor, and sorting the transistors according to the information decoded from the punch cards.

5. A method of testing and sorting semiconductor units for quantity production of transistors, wherein each of a plurality of transistors are manually loaded in respective test blocks, inserting a memory device in each test block for placing test information thereon at predetermined test stations, placing the plurality of test blocks in juxtaposed relationship on a test track on which are affixed the test stations, intermittently pushing the transistor loaded test blocks along the test track from one test station to another, initially removing transistors from the pushed test blocks which are of the predeterminedly wrong type, shorted, and plugged into the test block backwards, testing each transistor at each test station for predetermined transistor parameters, selectively and automatically indicating on each of the memory devices test information obtained from the transistor mounted therewith, decoding the test information on each memory device for classifying the related transistor according to predetermined categories, sorting each transistor according to the decoded test information, removing each transistor not sorted into the predetermined categories, automatically removing each memory device from the related test block and automatically returning each empty test block to the beginning of the test track for new transistors and memory devices.

6. A method of testing and sorting semiconductor units adapted for quantity production use, wherein each of a plurality of transistors is placed in a test block, manually loading a punch card in each test block, moving a plurality of the test blocks along a predetermined test cycle, punching test information on certain punch cards at each of a number of test stations located along the test cycle, sorting in predetermined categories the transistors according to the test information recorded on the punch cards, and removing at the end of the test cycle all transistors not sorted out in the predetermined categories.

7. A semiautomatic transistor testing machine adapted for quantity production testing of transistors, comprising a plurality of test blocks each operatively supporting a transistor and a memory card, a test track slidably supporting said test blocks, pretest stations operatively affixed to said test track for removing undesired transistors, test stations fixed to said test track each having test circuitry means and test information punch means integral therewith, sorting means responsive to test information received from said test circuitry and punched on said memory card by said punch means for selectively removing transistors in predetermined categories, transistor pulling means operatively associated with said test track for removing all transistors not selectively placed in predetermined categories, automatic removing means operatively associated with said test track to remove said memory cards, and means for returning empty test blocks to the beginning of said test track.

8. A production process for automatically testing and sorting electrical components, comprising: passing a plurality of components to be tested and a plurality of corresponding memory devices past at least one testing station, testing said components and recording the results of said tests on certain of said memory devices, passing said components and memory devices past at least one sorting station, decoding each said memory device and sorting those components whose memory device indicates a particular test result.

9. A production process for automatically testing and sorting electrical components, comprising: passing a plurality of components to be tested and a plurality of corresponding record cards past at least one testing station, testing said components and recording the results of said tests on certain of said cards, passing said components and memory devices past at least one sorting station, decoding each said card, and sorting those components whose record cards indicate a particular test result.

10. A production process for automatically testing and sorting electrical components, comprising: passing a plurality of components to be tested and a plurality of corresponding punch cards past at least one testing station, testing said components and punching the results of said tests on certain of said cards, passing said components and memory devices past at least one sorting station, decoding each said card, and sorting those components whose record cards indicate a particular test result.

11. A production process for automatically testing and sorting electrical components, comprising: passing a plurality of test blocks containing the components to be tested and memory means to record the results successively and intermittently past a plurality of testing stations, testing certain electrical characteristics of said components, recording the results of said tests on certain of said memory means, and passing said blocks, components and memory means past a plurality of sorting stations, decoding said memory means, and sorting said components in accordance with the results recorded in said memory means.

References Cited in the file of this patent
UNITED STATES PATENTS

| | | |
|---|---|---|
| 1,873,315 | Dreyer | Aug. 23, 1932 |
| 2,315,659 | Russell | Apr. 16, 1943 |
| 2,717,086 | Bush | Sept. 6, 1955 |
| 2,825,476 | Muller | Mar. 4, 1958 |